US007925840B2

(12) United States Patent
Harris et al.

(10) Patent No.: US 7,925,840 B2
(45) Date of Patent: Apr. 12, 2011

(54) DATA PROCESSING APPARATUS AND METHOD FOR MANAGING SNOOP OPERATIONS

(75) Inventors: Antony John Harris, Hope Valley (GB); Bruce James Mathewson, Papworth Everard (GB); Christopher William Laycock, Sheffield (GB)

(73) Assignee: ARM Limited, Cambridge (GB)

( * ) Notice: Subject to any disclaimer, the term of this patent is extended or adjusted under 35 U.S.C. 154(b) by 399 days.

(21) Appl. No.: 12/230,880

(22) Filed: Sep. 5, 2008

(65) Prior Publication Data

US 2010/0064108 A1    Mar. 11, 2010

(51) Int. Cl.
*G06F 12/00* (2006.01)
(52) U.S. Cl. .......... 711/146; 711/147; 711/154; 711/156
(58) Field of Classification Search .................. 711/146, 711/147, 154, 156
See application file for complete search history.

(56) References Cited

U.S. PATENT DOCUMENTS

| | | | |
|---|---|---|---|
| 5,860,114 A * | 1/1999 | Sell ............................... | 711/146 |
| 6,438,657 B1 * | 8/2002 | Gilda ........................... | 711/140 |
| 2004/0186963 A1 * | 9/2004 | Dieffenderfer et al. ....... | 711/146 |

OTHER PUBLICATIONS

U.S. Appl. No. 11/454,834, filed Jun. 19, 2006, Mansell.
U.S. Appl. No. 11/709,279, filed Feb. 22, 2007; Ozer et al.
A. Moshovos et al, "JETTY: Filtering Snoops for Reduced Energy Consumption in SMP Servers" Proceedngs of the 7th International Symposium on High-Performance Computer Architecture, Jan. 2001.
C. Saldanha et al, "Power Efficient Cache Coherence" Workshop on Memory Performance Issues in Conjunction with ISCA, Jun. 2001, pp. 1-15.
M. Ekman et al, "Evaluation of Snoop-Energy Reduction Techniques for Chip-Multiprocessors" Workshop on Duplicating, Deconstructing and Debunking, in Conjunction with ISCA, May 2002.
E. Atoofian et al, "A Power-Aware Prediction-Based Cache Coherence Protocol for Chip Multiprocessors" IEEE International Parallel and Distributed Processing Symposium, 2007. E. Bilir et al, "Multicast Snooping: A New Coherence Method Using a Multicast Address Network" Proceedings of the 26$^{th}$ Annual International Symposium on Computer Architecture, May 1999.
M. Ekman et al, "TLB and Snoop Energy-Reduction using Virtual Caches in Low-Power Chip-Multiprocessors" ISPLED'02, Aug. 2002.
A. Moshovos, "RegionScout: Exploiting Coarse Grain Sharing in Snoop-Based Coherence" Proceedings of the 32$^{nd}$ Annual International Symposium on Computer Architecture, 2005.

* cited by examiner

*Primary Examiner* — Stephen C Elmore
(74) *Attorney, Agent, or Firm* — Nixon & Vanderhye P.C.

(57) ABSTRACT

The present invention provides a data processing apparatus and method for managing snoop operations. The data processing apparatus has a plurality of processing units for performing data processing operations requiring access to data in shared memory, with at least two of the processing units having a cache associated therewith for storing a subset of the data for access by that processing unit. A snoop-based cache coherency protocol is employed to ensure data accessed by each processing unit is up-to-date, and when an access request is issued the cache coherency protocol is referenced in order to determine whether a snoop process is required. Snoop control storage is provided which defines a plurality of snoop schemes, each snoop scheme defining a series of snoop phases to be performed to implement the snoop process, and each snoop phase requiring a snoop operation to be performed on either a single cache or multiple caches. When a snoop process is required, a snoop unit is used to reference the snoop control storage in order to identify, having regard to one or more properties of the access request, the snoop scheme to be employed to perform the snoop process. Such an approach provides a great deal of flexibility with regards to how snoop processes are implemented, in particular allowing different snoop schemes to be used dependent on the properties of the access request in question.

30 Claims, 7 Drawing Sheets

DATA PROCESSING APPARATUS AND METHOD FOR MANAGING SNOOP OPERATIONS

BACKGROUND OF THE INVENTION

1. Field of the Invention

The present invention relates to techniques for managing cache coherency in a data processing apparatus, and in particular to techniques for managing snoop operations used to achieve such cache coherency.

2. Description of the Prior Art

It is known to provide multi-processing systems in which two or more processing units, for example processor cores, share access to shared memory. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

To further improve speed of access to data within such a multi-processing system, it is known to provide each of the processing units with its own local cache in which to store a subset of the data held in the shared memory. Whilst this can improve speed of access to data, it complicates the issue of data coherency. In particular, it will be appreciated that if a particular processor performs a write operation with regards to a data value held in its local cache, that data value will be updated locally within the cache, but may not necessarily also be updated at the same time in the shared memory. In particular, if the data value in question relates to a write back region of memory, then the updated data value in the cache will only be stored back to the shared memory when that data value is subsequently evicted from the cache.

Since the data may be shared with other processors, it is important to ensure that those processors will access the up-to-date data when seeking to access the associated address in shared memory. To ensure that this happens, it is known to employ a cache coherency protocol within the multi-processing system to ensure that if a particular processor updates a data value held in its local cache, that up-to-date data will be made available to any other processor subsequently requesting access to that data. Similarly, if that processor reads a data value, the cache coherency protocol will ensure that the processor obtains the most up-to-date data even if that data is held in a cache local to another processor.

In accordance with a typical cache coherency protocol, certain accesses performed by a processor will require a coherency operation to be performed. Often, the coherency mechanism employs a snoop-based scheme, and in such situations the coherency operation takes the form of a snoop process during which snoop operations are performed in the caches of other processors. In particular, given the type of access taking place and the address being accessed, the caches being snooped will perform certain actions defined by the cache coherency protocol, and this may also in certain instances result in information being fed back from one or more of those caches to the processor performing the access that caused the coherency operation to be initiated. By such a technique, the coherency of the data held in the various local caches is maintained, ensuring that each processor accesses up-to-date data. One such cache coherency protocol is the "Modified, Exclusive, Shared, Invalid" (MESI) cache coherency protocol.

If a particular piece of data can be guaranteed to be exclusively used by only one of the processors, then when that processor accesses that data, a coherency operation will not be required. However, in a typical multi-processing system, much of the data will be shared amongst the processors, either because the data is generally classed as shared data, or because the multi-processing system allows for the migration of processes between processors, or indeed for a particular process to be run in parallel on multiple processors, with the result that even data that is specific to a particular process cannot be guaranteed to be exclusively used by a particular processor.

Accordingly, it will be appreciated that coherency operations will be required to be performed frequently, and this will result in significant numbers of snoop operations being performed in the caches to determine whether the data value that is the subject of a particular access request is or is not within those caches. Hence, by way of example, if a cache line in the cache associated with one of the processing units has its data content modified, and that data is shared, this will typically cause a coherency operation to be performed as a result of which snoop operations will be performed in all of the other caches associated with the other processing units. If the same cache line is stored within those caches, that copy of the cache line will either be invalidated or updated dependent on the coherency protocol being applied. However, if in fact a copy of that cache line does not reside in the cache, nothing further is required, but some energy is consumed as a result of performing the snoop operation within the cache due to the lookup performed with respect to the tag entries of the cache. Accordingly, it can be seen that the data processing apparatus consumes some considerable energy (also referred to a snoop energy) in performing snoop operations in order to find out whether a copy of a cache line exists in a cache or not. Traditionally this is done for each cache associated with each processing unit, and if the snoop hit rate is very low (i.e. a large proportion of the caches subjected to the snoop operation do not locate a copy of the cache line in question), it is clear that significant snoop energy is wasted.

Whilst energy consumption in some multi-processing systems may not be a key concern, as use of multi-processing systems becomes more widespread, there are many modern day implementations (e.g. multi-core systems) where energy consumption is very important.

A number of techniques have been developed with the aim of seeking to reduce the energy consumption associated with performing such snoop operations in a data processing apparatus having multiple processing units. For example, the article entitled "JETTY: Filtering Snoops for Reduced Energy Consumption in SMP Servers" by A Moshovos et al, Proceedings of International Symposium on High Performance Computer Architecture (HPCA-7), January 2001, describes a technique for reducing the energy consumed by snoop requests in a symmetric multiprocessor (SMP) system, where a small, cache-like, structure, referred to therein as a JETTY, is introduced in between the bus and the level two cache at each SMP node. Each SMP node has local level one data and instruction caches and a level two cache. Every snoop request issued over the snoop bus to an SMP node first goes to the associated JETTY, with a lookup being performed in that JETTY to determine whether the data value in question is definitely not in the associated level two cache (and accordingly that level two cache does not need to subjected to a snoop operation), or whether there may be a copy of the data value in question in that cache (and therefore the level two cache does need to be subjected to a snoop operation). In accordance with one embodiment described, a Bloom filter mechanism is used to implement each JETTY.

Another SMP-based snoop energy reduction technique was proposed by Saldanha et al in the article "Power Efficient Cache Coherence", Workshop on Memory Performance Issues in Conjunction with ISCA, June 2001. In this article, a similar SMP structure is described to that disclosed in the earlier JETTY article, namely having four processor nodes, each having a level two cache. The approach described in the article to reduce snoop energy is to serialise the snooping process in a hierarchical way. This technique is described in the article as "Serial Snooping", which is only applied to read misses. In the event of a read miss, the neighbour node of the requesting processor is snooped to get the requested block of data. If that neighbour node does not have the requested block, the next node is snooped. This process is continued until a cache or the memory supplies the requested block. Two drawbacks of such an approach are that it can only reduce the volume of snoop operations resulting from read misses, and also it increases the latency of the load operation.

In the article "Evaluation of Snoop-Energy Reduction Techniques for Chip-Multiprocessors" by M Ekman et al, Workshop on Duplicating, Deconstructing and Debunking, in Conjunction with ISCA, May 2002, the above mentioned JETTY and serial snooping techniques are evaluated and it is concluded in that article that serial snooping does not manage to cut much energy because most of the time no caches will be able to respond, which means that all caches will be searched. With regard to the JETTY technique, it is observed that a significant portion of the snoop energy is cut but this saving is outweighed by the energy lost in implementing the JETTY mechanism.

The article "A Power-Aware Prediction-Based Cache Coherence Protocol for Chip Multiprocessors" by E Atoofian et al, IPDPS, page 343, 2007 IEEE International Parallel and Distributed Processing Symposium, 2007, describes a technique where each cache has a single entry predictor identifying which cache had the data most recently accessed by its associated processor, together with the number of consecutive hits from that cache. Initially, snoop operations are issued in parallel to all caches, but if the number of consecutive hits is above a threshold, then an initial snoop is performed only in the cache identified in the single entry predictor, with a fully parallel snoop of the remaining caches then being initiated if the initial snoop misses. The scheme can provide a reduction in snoop energy in systems where there is high correlation between temporal locality and hit probability in a given cache. Such a system would, for example, be one where if a cache miss occurs in the cache of processor A, and the required data is residing in and provided by processor B's local cache, there is a high probability that next time processor A has a cache miss in its local cache, that data will again be provided by processor B's local cache. However, such a scheme lacks generality or flexibility, and will provide little benefit in many systems.

The article "Multicast Snooping: A New Coherence Method Using a Multicast Address Network" by E Bilir et al, in Proceedings of the 26$^{th}$ Annual International Symposium on Computer Architecture, Atlanta, Ga., May 1999, describes a coherence method called "multicast snooping" that dynamically adapts between broadcast snooping and a directory protocol. In accordance with this scheme, each coherence transaction leaving a processor is accompanied by a multicast mask that specifies which processors should snoop the transaction. Masks are generated using prediction and need not be correct. A simplified directory in memory then checks the mask of each transaction, detecting masks that omit necessary processors, and taking corrective action. Such an approach is costly in terms of the need to support both snoop based and directory based coherency schemes, and will impact performance in situations where the original predicted mask is incorrect.

Various prior art techniques have been developed in the area of "snoop filtering", where the techniques attempt to accurately identify any caches which do not need to be subjected to the snoop, such that the number of snoop operations can be reduced. For example, the article "TLB and Snoop Energy-Reduction using Virtual Caches in Low-Power Chip-Multiprocessors" by M Ekman et al, ISPLED'02, August 2002, describes a snoop filtering technique for level one virtual caches in a Chip-Multiprocessor (CMP) system. Further, the article "RegionScout: Exploiting Coarse Grain Sharing in Snoop-Based Coherence" by A Moshovos, Proceedings of the 32$^{nd}$ Annual International Symposium on Computer Architecture, 2005, describes another snoop filtering technique that performs filtering at a coarser granularity, i.e. memory regions rather than cache blocks.

In addition, co-pending, commonly owned, U.S. patent application Ser. No. 11/454,834 describes a scheme where masks are maintained in association with each cache identifying, for the process currently being executed by that cache's processor, those other processors that may also have data associated with that process, such that when a snoop operation is required, the number of caches which need to be subjected to that snoop operation can be reduced.

Co-pending, commonly owned, U.S. patent application Ser. No. 11/709,279 describes a scheme where cache coherency circuitry takes advantage of information already held by indication circuitry provided for each cache and used to reduce the number of segments of the cache subjected to cache lookup operations. In particular, the cache coherency circuitry has snoop indication circuitry associated therewith whose content is derived from the segment filtering data of each indication circuitry. When snoop operations are required, the snoop indication circuitry is then referenced to determine which caches need to be subjected to a snoop operation.

Whilst significant development has been undertaking in the area of snoop filtering, it is still likely that unnecessary snoop operations will be performed even if snoop filtering techniques are used. Accordingly, irrespective of whether snoop filtering is used or not, it would still be desirable to provide an improved technique for managing snoop operations, and in particular one which has the potential to further reduce the energy consumed when performing snoop operations.

The energy consumption issue is becoming more significant with recent developments in interconnect technology. In particular, traditional snoop-based cache coherency solutions employed a shared bus interconnecting the snooped caches, which allowed for the cheap broadcast of snoop requests to all participating caches. However, with more modern System-on-Chip (SoC) architectures, shared buses are no longer desirable for connecting physically and logically disparate cache components, and these are instead often replaced with point-to-point request/response channels. A side effect of this is that broadcasting snoop requests to all participating caches incurs significant power consumption. However, the parallel snooping of multiple caches is optimal in terms of performance.

Accordingly, it would be desirable to develop a technique which provided flexibility with respect to the handling of snoop operations, allowing a reduction in energy consumption whilst retaining the ability to achieve high performance.

SUMMARY OF THE INVENTION

Viewed from a first aspect, the present invention provides a data processing apparatus comprising: a plurality of processing units for performing data processing operations requiring access to data in shared memory; at least two of said processing units having a cache associated therewith for storing a subset of said data for access by that processing unit; cache coherency circuitry for employing a snoop-based cache coherency protocol to ensure data accessed by each processing unit is up-to-date, on issuance of an access request by one of said processing units, the cache coherency circuitry determining whether a snoop process is required having regard to the snoop-based cache coherency protocol; snoop control storage for defining a plurality of snoop schemes, each snoop scheme defining a series of snoop phases to be performed to implement the snoop process, and each snoop phase requiring a snoop operation to be performed on either a single cache or multiple caches; and a snoop unit, responsive to the cache coherency circuitry determining that said snoop process is required, to reference the snoop control storage to identify, having regard to one or more properties of the access request, the snoop scheme to be employed to perform said snoop process.

In accordance with the present invention snoop control storage is provided which defines a plurality of snoop schemes. Each snoop scheme defines a series of snoop phases to be performed to implement the snoop process, with each snoop phase requiring a snoop operation to be performed on either a single cache or multiple caches. The actual snoop scheme used to implement any particular required snoop process is then determined by the snoop unit having regard to one or more properties of the access request. This hence provides a great deal of flexibility with regards to the handling of snoop processes, and in particular different snoop schemes can be used for different access requests. For example, this means that different snoop schemes may be used for access requests issued by different processors, for access requests of different types (for example read access requests, write access requests, cache maintenance access requests, etc), for access requests to different address ranges, and/or for access requests with different associated transaction properties (one example of transaction property being a priority of the program thread running on the processor and giving rise to the access request).

Whilst each snoop scheme will define a series of snoop phases, the number of snoop phases may vary between snoop schemes, as may the number of caches accessed in each snoop phase. For access requests where high performance is required, snoop schemes can be defined with relatively few snoop phases, with each snoop phase requiring multiple caches to be snooped, whilst for access requests where low energy consumption is deemed more important than processing speed, a snoop scheme with a larger number of snoop phases can be identified, often with some of the initial snoop phases including accesses to only a single cache, or to a small number of caches. This can be particularly beneficial when it is considered that there is a likelihood of the data being found in a subset of the total number of caches, the use of multiple snoop phases enabling the caches to be snooped in some logical order based on such likelihood of the data being found in any particular cache.

In one embodiment, the snoop control storage is programmable to allow modification of the plurality of snoop schemes. This provides further flexibility, allowing the opportunity to optimize snoop behaviour for each application use case. In one embodiment reprogramming may take place in response to metrics derived from previous use of a snoop scheme, in response to occurrence of one or more events such as a change in mode of operation, etc.

In one embodiment, the snoop operation of a current snoop phase is completed before a next snoop phase is performed. However, alternatively, a next snoop phase can be arranged to start before the current snoop phase has completed, for example in situations where one or more of the caches subjected to the snoop operation in the current snoop phase are taking longer to respond than some predetermined time.

As discussed above, a wide variety of different snoop schemes may be defined in the snoop control storage. Hence, the plurality of snoop schemes may comprise at least one snoop scheme with a different number of snoop phases to at least one other snoop scheme. Further, the plurality of snoop schemes may comprise at least two snoop schemes which have the same number of snoop phases, but which for at least one snoop phase differ with respect to whether a single cache or multiple caches are subjected to the snoop operation in that snoop phase. Purely by way of illustration, for two snoop schemes both employing four snoop phases, one scheme may employ an SSSP pattern, whilst another scheme may employ an SPPS pattern (where S denotes a snoop phase requiring a snoop operation to be performed on a single cache, and P denotes a snoop phase requiring a snoop operation to be performed on multiple caches).

In one embodiment, the snoop control storage provides at least one snoop scheme for each processing unit in said plurality, and the one or more properties of the access request used to determine which snoop scheme is to be employed to perform said snoop process comprise at least an identification of the processing unit issuing said access request.

Whilst the snoop control storage may be provided centrally, in one embodiment the snoop control storage may provide a snoop control storage block for each processing unit, each snoop control storage block defining at least one snoop scheme that may be used to implement the snoop process for access requests issued by the associated processing unit. When employing such separate snoop control storage blocks, these may be located, for example, at the interface of the processing units/local caches with the coherent interconnect fabric of the data processing apparatus.

In one embodiment, the snoop control storage defines snoop schemes for different types of access request, and the one or more properties of the access request used to determine which snoop scheme is to be employed to perform said snoop process comprise at least an identification of the type of said access request.

In one embodiment the snoop control storage may additionally, or alternatively, define snoop schemes for different memory address ranges, and the one or more properties of the access request used to determine which snoop scheme is to be employed to perform said snoop process comprise at least an identification of the memory address specified by said access request.

Furthermore, in one embodiment, the snoop control storage may additionally, or alternatively, define snoop schemes for different transaction properties associated with access requests, and the one or more properties of the access request used to determine which snoop scheme is to be employed to perform said snoop process comprise at least an identification of the transaction property associated with said access request. The transaction property may, for example, be identified by the processing unit issuing the access request, as for example may be the case for a priority associated with a program thread being executed by the processing unit. In such instances, high priority access requests may have their required snoop processes actioned by a snoop scheme different to a snoop scheme used for access requests from the same processing unit but relating to lower priority program threads. In another example, a transaction property associated with an access request may be a quality of service (QoS) identifier. This may be known to the processing unit issuing the access request, or may be identified some point after the access request has been issued, for example at the interface to the coherent interconnect fabric.

The snoop control storage can be arranged in a variety of ways. However, in one embodiment each snoop scheme is constrained to a maximum number of snoop phases, the snoop control storage providing a set of registers for storing each snoop scheme, the number of registers in each set being dependent on the maximum number of snoop phases. In one particular embodiment, the number of registers in the set is equal to the maximum number of snoop phases, with one register being allocated to each possible snoop phase.

In one embodiment, if the snoop scheme defined in one set of registers has less than said maximum number of snoop phases, one or more registers in that set of registers are marked as unused. In one embodiment, this may be achieved merely by setting all bits in the relevant register to zero, thus not identifying any caches to be accessed in the associated snoop phase.

In embodiments of the present invention, there are certain situations where it is possible to terminate the snoop scheme early. In particular, in one embodiment, if the access request is a read access request, and the data which is the subject of the access request is located in a cache during a particular snoop phase of the snoop scheme, any remaining phases of the snoop scheme are not performed. Since the cache coherency protocol will make sure that all copies of the data are up to date, once one copy of the data has been found, there is no need to continue to snoop any of the remaining caches, and accordingly snoop energy can be further reduced by terminating the snoop scheme at that point.

It is also possible in certain situations to terminate a snoop scheme early in respect to a write access request. In particular, in one embodiment, if the access request is a write access request, and the data which is the subject of the access request is located in a cache during a particular snoop phase of the snoop scheme, and is identified as being exclusively held in that cache, any remaining phases of the snoop scheme are not performed. Typically, each cache will keep state information in association with the data that it stores, and accordingly will know whether any particular item of data is exclusively owned by that cache or is shared with other caches. By returning that state information in response to the snoop operation, it can then be determined whether there is any need to continue with the further phases of the snoop scheme, and in particular if the data is exclusively held in the cache that is responding to the snoop operation, any remaining phases of the snoop scheme can be omitted.

It is also possible in certain situations to terminate the snoop scheme early, and instead return to the standard parallel snoop of all relevant caches. In particular, in one embodiment, if the access request is a write access request, the cache coherency protocol applies a write invalidate protocol, and the data which is the subject of the access request is located in a cache during a particular snoop phase of the snoop scheme but is not identified as being exclusively held in that cache, any remaining phases of the snoop scheme are not performed, and instead the snoop operation is performed in parallel on all remaining relevant caches not yet subjected to the snoop operation. Once the data has been located and has been identified as not being exclusively held, it is necessary to snoop all of the relevant caches that have not yet been subjected to the snoop operation. The relevant caches for any particular snoop process will be those caches where the data may be potentially stored. Hence, in one example the relevant caches may be all caches other then the local cache of the processor that issued the access request that resulted in the snoop process. Alternatively, if some form of snoop filtering technique is applied, then the relevant caches may be a subset of the overall total number of caches in the system.

Whilst in one embodiment, the snoop scheme identified by the snoop control storage will always be used to implement the snoop process, it is possible in some embodiments to selectively override that snoop scheme. For example, in one embodiment, the snoop control storage includes override circuitry for receiving one or more performance requirement indicators, when the cache control circuitry references the snoop control storage, the override circuitry being arranged, dependent on said performance requirement indicators, to either identify, having regard to one or more properties of the access request, the snoop scheme to be employed to perform said snoop process, or instead to indicate to the snoop unit that the snoop operation should be performed in parallel in all relevant caches.

Hence, by way of example, if the performance requirement indicators that are relevant to the processor that has issued the access request dictate that a snoop operation should be performed as quickly as possible, then the override circuitry can in this embodiment decide not to use the snoop scheme that would be selected having regard to the access request, but instead to instruct the snoop unit to perform a parallel snoop of all relevant caches.

The performance requirement indicators can take a variety of forms. For example, in one embodiment, they may be indicative of particular modes of operation of the data processing apparatus. Hence, for example, in one particular full power mode of operation where performance is the key criteria, the override circuitry may choose to override the snoop scheme that may otherwise be chosen and instead instruct the snoop unit to perform a parallel snoop of all relevant caches. However, for any of the other modes of operation, the override circuitry may be arranged not to exercise its ability to override, and instead the identified snoop scheme would be used.

In one embodiment, circuitry can be added to allow for the dynamic update of snoop schemes stored in the snoop control storage. For example, in one embodiment, the cache control circuitry further comprises monitor circuitry for maintaining, for a snoop scheme defined in the snoop control storage, one or more metrics derived from results of previous use of that snoop scheme, and to dynamically modify which caches are associated with each snoop phase of that snoop scheme dependent on said one or more metrics. The metrics may take a variety of forms, but in one embodiment at least one of the metrics is a history of previous caches where hits have been detected during the snoop process. In such embodiments, whilst the actual snoop scheme is not changed, the allocation of particular caches to each snoop phase may be altered. Hence for example, if an initial snoop phase originally identified that caches 2 and 3 should be snooped, it is possible using such a mechanism to update that initial snoop phase so that caches 2 and 4 are snooped, with a snoop to cache 3 then taking place during some later snoop phase.

In addition to dynamically modifying the cache allocation to particular snoop phases, it is also possible dependent on the metrics maintained by the monitor circuitry to decide whether to dynamically reprogram the snoop scheme itself. Hence, for example, the original snoop scheme may be replaced with a different snoop scheme having less snoop phases, or with a snoop scheme where at a particular snoop phase a snoop operation is performed to multiple caches where previously a snoop operation to a single cache would have taken place (or vice versa).

In one embodiment, the snoop control storage may be arranged so that it is programmed once at boot time. Following boot, it is then envisaged that the snoop control storage would not be updated, and that hence the snoop schemes would be statically defined.

However, in an alternative embodiment the snoop control storage can be arranged so that it is programmed periodically during run time. In particular, in one embodiment, the snoop control storage may be reprogrammed on occurrence of one or more events during operation of the data processing apparatus. Such events may take a variety of forms, but in one embodiment may comprise at least one of a change in a global mode of operation or a change of task by one of the processing units.

Considering the issue of changes in global mode of operation, if by way of example we consider the data processing apparatus to be incorporated within a mobile phone capable of not only operating as a phone, but also as an MP3 player, a games console, etc, in accordance with such embodiments of the present invention it would be possible to reprogram the snoop control storage following a change in the function being performed by the phone. For example, if the phone was being used to run a game, and then switched to a mode of operation where it is operated as a phone, it may be appropriate to change the snoop schemes both in terms of the number of snoop phases and in terms of the actual caches allocated to each snoop phase. As a particular example, whereas the cache associated with a graphics processing unit (GPU) may have been snooped fairly early on in the snoop scheme when the phone was running a game, it may be appropriate to demote that lookup to a much later stage of the snoop scheme, or omit the GPU's cache altogether from the snoop process, when the mode of operation is changed to the normal phone mode.

Similarly, even if there is not a change in the global mode of operation, if there is a change in task being executed by a particular processing unit, then it may be appropriate to reprogram the snoop schemes that are to be used for access requests issued by that processing unit.

In one embodiment, the data processing apparatus further comprises a supervisor processor for monitoring the global mode of operation of the data processing apparatus and for reprogramming one or more of the snoop schemes in the snoop control storage upon a change in said global mode of operation. Hence, in this embodiment, there is a processor responsible for the task of monitoring the global mode of operation, and reprogramming the snoop schemes as and when appropriate. In one embodiment, the supervisor processor has access to a lookup table identifying the snoop schemes to be used for each global mode of operation. Hence, in such embodiments, sets of snoop schemes can be established in the lookup table for each of the different global modes of operation, and a supervisor processor can then program in the appropriate set of snoop schemes as and when the global mode of operation changes. In one embodiment, in addition to the supervisor processor being able to reprogram the snoop schemes, it is also possible for one or more of the other processors in the system to have access to a programming interface via which the snoop schemes may be reprogrammed in the snoop control storage.

In one embodiment, at least one of the snoop schemes defined in said snoop control storage omits one or more caches from all of the snoop phases. Hence, by such an approach, sparse snooping may be employed, where the snoop process is restricted to a subset of the total possible caches that could be snooped. Such an approach may for example be appropriate when the system designer or programmer knows empirically that two or more processing units do not share data.

For certain types of access requests, it will be necessary to access the shared memory if as a result of the snoop process the required data is not identified in any of the snooped caches. Hence, by way of example, if a read access request is issued, and the data is not found in any of the snooped caches, then it will be necessary to read the data from the shared memory. Whilst in one embodiment the completion of the snoop process may be awaited before shared memory is accessed, in one embodiment the snoop unit is arranged to initiate a lookup in the shared memory at a point during performance of the snoop process that is dependent on the identified snoop scheme. Hence, the access to shared memory can be initiated whilst the snoop process is in progress, thereby hiding some of the latency involved in performing an access to shared memory, and furthermore the time at which the access to shared memory is initiated can be varied dependent on the identified snoop scheme being used. This provides a great deal of flexibility as to how accesses to shared memory are managed when snoop processes are also required.

Viewed from a second aspect, the present invention provides a method of managing snoop operations in a data processing apparatus, the data processing apparatus comprising a plurality of processing units for performing data processing operations requiring access to data in shared memory, at least two of said processing units having a cache associated therewith for storing a subset of said data for access by that processing unit, the method comprising the steps of: employing a snoop-based cache coherency protocol to ensure data accessed by each processing unit is up-to-date; on issuance of an access request by one of said processing units, determining whether a snoop process is required having regard to the snoop-based cache coherency protocol; defining within snoop control storage a plurality of snoop schemes, each snoop scheme defining a series of snoop phases to be performed to implement the snoop process, and each snoop phase requiring a snoop operation to be performed on either a single cache or multiple caches; and when said snoop process is required, referencing the snoop control storage to identify, having regard to one or more properties of the access request, the snoop scheme to be employed to perform said snoop process.

Viewed from a third aspect, the present invention provides a coherent interconnect fabric for use in a data processing apparatus having a plurality of processing units for performing data processing operations requiring access to data in shared memory, at least two of said processing units having a cache associated therewith for storing a subset of said data for access by that processing unit, the data processing apparatus employing a snoop-based cache coherency protocol to ensure data accessed by each processing unit is up-to-date, on issuance of an access request by one of said processing units, the snoop-based cache coherency protocol being referenced to determine whether a snoop process is required, the coherent interconnect fabric comprising: snoop control storage for defining a plurality of snoop schemes, each snoop scheme defining a series of snoop phases to be performed to implement the snoop process, and each snoop phase requiring a snoop operation to be performed on either a single cache or multiple caches; and a snoop unit, responsive to a determination that said snoop process is required, to reference the snoop control storage to identify, having regard to one or more properties of the access request, the snoop scheme to be employed to perform said snoop process.

Viewed from a fourth aspect the present invention provides a data processing apparatus comprising: a plurality of processing means for performing data processing operations requiring access to data in shared memory means; at least two of said processing means having a cache means associated therewith for storing a subset of said data for access by that processing means; cache coherency means for employing a snoop-based cache coherency protocol to ensure data accessed by each processing means is up-to-date, on issuance of an access request by one of said processing means, the cache coherency means for determining whether a snoop process is required having regard to the snoop-based cache coherency protocol; snoop control storage means for defining a plurality of snoop schemes, each snoop scheme defining a series of snoop phases to be performed to implement the snoop process, and each snoop phase requiring a snoop operation to be performed on either a single cache or multiple caches; and a snoop means, responsive to the cache coherency means determining that said snoop process is required, for referencing the snoop control storage means to identify, having regard to one or more properties of the access request, the snoop scheme to be employed to perform said snoop process.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
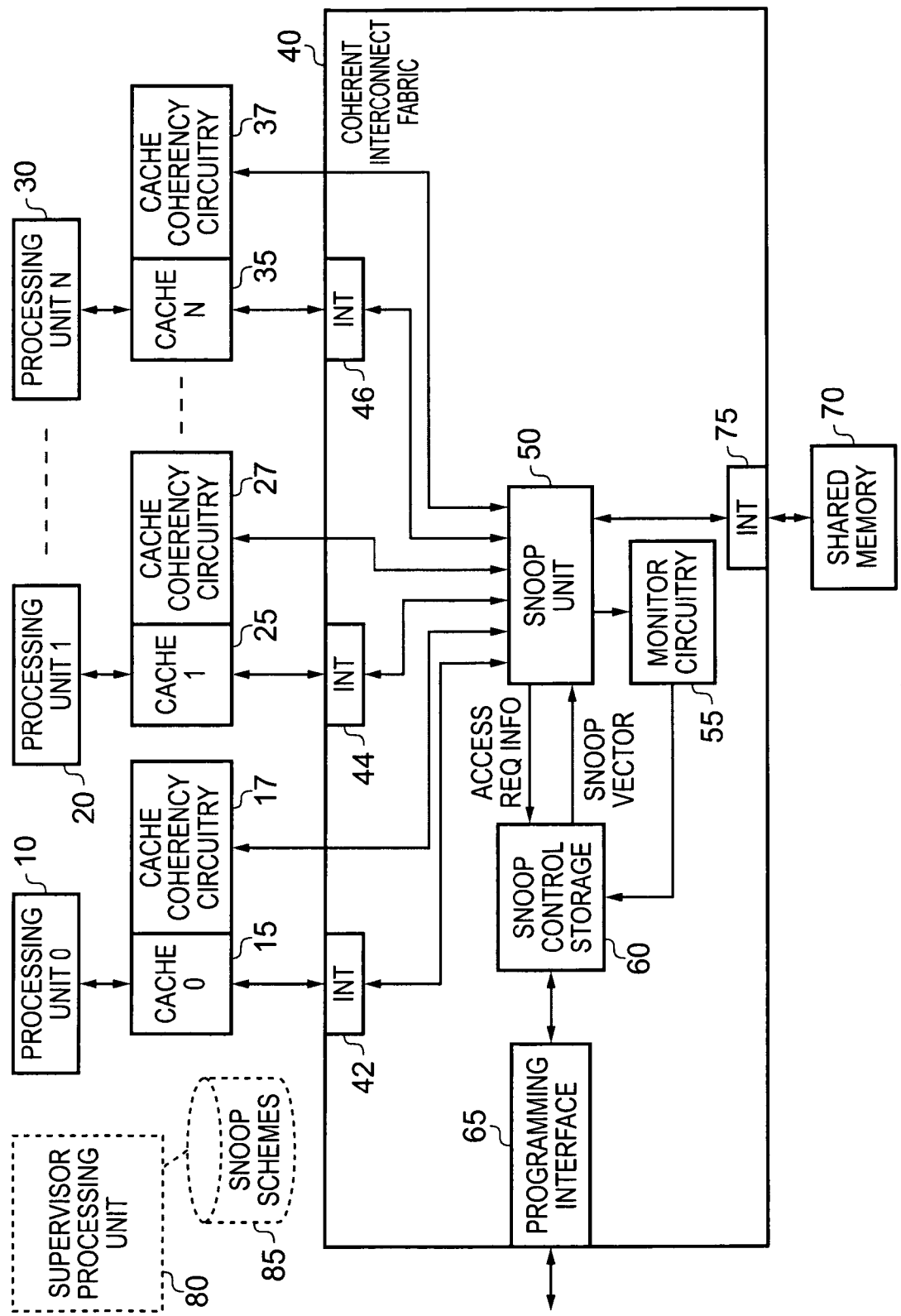
FIG. 1 is a block diagram of a data processing apparatus in accordance with one embodiment of the present invention.

FIG. 1 is a block diagram of a data processing apparatus in accordance with one embodiment of the present invention. A plurality of processing units 10, 20, 30 are provided, and at least two of those processing units will have a local cache associated therewith. In the embodiment illustrated in FIG. 1, each of the processing units 10, 20, shown have a local cache 15, 25, 35 associated therewith. Each local cache also has cache coherency circuitry 17, 27, 37 associated therewith which is used to employ a snoop-based cache coherency protocol to ensure data accessed by each processing unit is up-to-date.

The various processing units and associated caches are coupled to the coherent interconnect fabric 40, the coherent interconnect fabric 40 also being connected to shared memory 70. The coherent interconnect fabric 40 allows multiple devices to be interconnected, with each device connecting to a particular interface of the coherent interconnect fabric 40. Hence, in the example illustrated in FIG. 1, processing unit 10 and associated cache 15 are connected to the interface 42, processing unit 20 and cache 25 are connected to the interface 44, processing unit 30 and cache 35 are connected to the interface 46, and the shared memory 70 is connected to the interface 75. Although there are a number of ways in which the coherent interconnect fabric 40 may be constructed so as to allow communication between the various connected devices, in one embodiment the coherent interconnect fabric employs a point-to-point request/response channel structure.

When one of the processing units issues an access request, then a lookup operation will typically be performed in its local cache, and if the data which is the subject of the access request is found in the cache, it will typically be accessed locally in that cache. However, the cache coherency circuitry associated with the cache will also determine whether a snoop process is required. For example, if processing unit 10 performs a write access request, and the specified memory address already resides in the cache 15, the processing unit may be arranged to directly perform the write operation on the data already cached in the cache 15. However, the cache coherency circuitry 17 may know that the data is not exclusively held by the cache 15, and accordingly may identify to the snoop unit 50 within the coherent interconnect fabric 40 that a snoop process is required. The operation of the snoop unit will be discussed in more detail later.

Further, if on performing a lookup in the local cache, it is determined that the data required is not present in the cache (a "cache miss"), then the access request will typically be propagated from the cache to the coherent interconnect fabric 40. Whilst the cache may propagate on the access request in its original form, the access request as propagated from the cache following a cache miss often a takes a slightly modified form. For example, it is often the case that on a cache miss the cache will issue an access request specifying a linefill operation, such that an entire cache line's worth of data, including the data that the processing unit had originally requested, is subsequently returned to the cache. Herein, we will merely refer to the request issued by the cache following the cache miss as being the access request, whether that access request is the same or modified with respect to the original access request issued by the associated processing unit.

For an access request propagated from the cache to the associated interface of the coherent interconnect fabric 40, the cache coherency circuitry will again have decided whether a snoop process is required. If a snoop process is required, the interface will communicate with the snoop unit 50, whereas if no snoop process is required, the interface can route the signal directly to the appropriate recipient of the access request, typically the shared memory 70 via the interface 75.

There are a number of known cache coherency protocols which can be applied by the cache coherency circuitry 17, 27, 37, for example the MESI cache coherency protocol or the MOESI cache coherency protocol. The techniques of embodiments of the present invention do not alter the cache coherency protocol applied by the cache coherency circuitry, but instead seek to provide a mechanism by which the snoop unit 50 can reduce the number of caches subjected to snoop operations when the requirement for a snoop process is determined by the cache coherency protocol. In particular, as illustrated in FIG. 1, when snoop unit 50 determines that a snoop process is required, it accesses the snoop control storage 60, passing to the snoop control storage certain information derived from the access request giving rise to the need for a snoop process. The snoop control storage 60 is programmable to define a plurality of snoop schemes, with each snoop scheme defining a series of snoop phases to be performed to implement the snoop process. Each snoop phase will require a snoop operation to be performed on either a single cache or multiple caches, with the snoop operation of a current snoop phase being completed before a next snoop phase is performed.

Based on the access request information received from the snoop unit 50, the snoop control storage 60 will determine the appropriate snoop scheme to be used to perform the snoop process, and will return that information as one or more snoop vectors to the snoop unit 50. In one embodiment, the entire snoop scheme may be output to the snoop unit 50 as a series of snoop vectors, each snoop vector identifying the caches to be subjected to the snoop operation in an associated snoop phase. Alternatively, the snoop control storage 60 may initially output a single snoop vector to the snoop unit 50, identifying the first snoop phase, and in particular defining the one or more caches to be subjected to the snoop operation in that first snoop phase. For each snoop phase, the snoop unit 50 will issue control signals to the relevant cache coherency circuits 17, 27, 37 to cause the caches-associated with that snoop phase to be snooped. The results of that snoop operation will then be returned from the relevant cache coherency circuits 17, 27, 37 to the snoop unit 50. Once the first snoop phase is completed, the snoop unit 50 may then access the snoop control storage 60 again to obtain the snoop vector for the next snoop phase, with the process being repeated until all snoop phases of the required snoop scheme have been completed.

Whilst in the above discussion a next snoop phase is not started until a current snoop phase has completed, in an alternative embodiment situations can arise where the next snoop phase is initiated before all results of the current snoop phase are received. For example, if one or more of the caches subjected to the snoop operation in a current snoop phase are taking too long to respond (for example as measured with respect to some predetermined period of time), then it may be determined to initiate the next snoop phase without waiting for the current snoop phase to complete.

The mechanism described above with reference to FIG. 1 provides a great deal of flexibility with regards to the handling of snoop processes, and in particular different snoop schemes can be used for different access requests. For example, different snoop schemes may be used for access requests issued by different processors, for access requests of different types, for access requests to different address ranges, and/or for access requests with different associated transaction properties (priority, QoS, etc).

Further, whilst each snoop scheme will define a series of snoop phases, the number of snoop phases can be varied between snoop schemes, as may the number of caches accessed in each snoop phase. Hence, by such an approach, the manner in which snoop processes are handled is dictated by one or more properties of the access request, thereby allowing the exact manner in which the snoop process is implemented to be tailored for particular access request properties.

The snoop control storage may be arranged in a variety of ways. However, in one embodiment, a set of registers are provided for each snoop scheme, with those registers being programmed via the programming interface 65 in order to define the associated snoop scheme. In one embodiment, each snoop scheme is constrained to a maximum number of snoop phases, and the number of registers in each set within the snoop control storage is then dependent on the maximum number of snoop phases. Purely by way of illustration, if the maximum number of snoop phases is set to 4, then in one embodiment each set of registers may contain four registers, with one register being used to define each snoop phase. However, it will be appreciated that there is no requirement to restrict the maximum number of snoop phases to four, nor is there any requirement for each snoop phase to be defined only by the contents of a single register.

In one embodiment, each bit within the register is associated with one of the caches, and if that bit in the register is set, this identifies that the corresponding cache should be snooped during the identified snoop phase. In one embodiment, if the snoop scheme defined in one set of registers has less then the maximum number of snoop phases, one or more of the registers are marked as unused when that set of registers is programmed. In one particular embodiment, this may be achieved by clearing all of the bits in the relevant register, thereby indicating that no caches are to be snooped in that snoop phase. It will be appreciated that the logic values associated with the set and the clear states of the bits within the registers may be changed dependent on implementation. However, in one embodiment the set state is indicated by a logic one value and the clear state is indicated by a logic zero value.

There are a number of ways in which the snoop control storage 60 can be arranged to be programmed. In one embodiment, the snoop control storage may be arranged to programmed once at boot time, whereafter the snoop scheme will be statically defined within the snoop control storage 60. However, in an alternative embodiment the snoop control storage 60 may be programmed periodically during run time, via control signals issued to the programming interface 65. These control signals may be issued in response to one or more programs executing on one of the processing units 10, 20, 30, or alternatively a supervisor processing unit 80 may be provided for detecting situations where the snoop scheme should be reprogrammed, and for issuing the necessary control signals to the programming interface 65.

In one embodiment, the snoop control storage is reprogrammed on occurrence of one or more events during operation of the data processing apparatus, for example when there is a change in a global mode of operation of the device, or if there is change of task being executed by one of the processing units 10, 20, 30.

Hence, in one embodiment, the optional supervisor processing unit 80 may be arranged to monitor the global mode of operation of the apparatus and to reprogram one or more of the snoop schemes stored in the snoop control storage 60 on occurrence of a change in global mode of operation. As shown in FIG. 1, the supervisor processing unit 80 may have access to a lookup table 85 identifying the snoop scheme to be used for each global mode of operation. Thus, in such embodiments, sets of snoop schemes can be established in the lookup table 85 for each of the different global modes of operation (for example MP3 mode, game mode, phone mode, etc, considering the example of a data processing apparatus incorporated within a mobile phone), and the supervisor processing unit 80 will then reprogram the appropriate set of snoop schemes in the snoop control storage 60 as and when the global mode of operation changes.

As mentioned above, individual processing units 10, 20, 30 can also detect events which indicate that a reprogramming of the snoop control storage 60 should take place. For example, when there is a change of task executing on a processing unit, it can then issue appropriate reprogramming control signals to the programming interface 65 to cause one or more of the snoop schemes to be reprogrammed, for example any snoop scheme associated with access requests from that processing unit.

In some embodiments of the present invention, monitor circuitry 55 can also be provided to provide another mechanism for dynamic update of snoop schemes stored in the snoop control storage 60. In particular, for one or more of the stored snoop schemes, the monitor circuitry may maintain one or more metrics derived from the results of previous use of that snoop scheme, this information for example being provided by the snoop unit 50. The metrics may take a variety of forms, and in one example take the form of a history of previous caches where hits have been detected during the snoop process. These metrics can then be used for a variety of purposes. For example, in one embodiment, whilst the monitor circuit does not change the snoop scheme itself, it can change the allocation of particular caches to each snoop phase of the snoop scheme. For example, if the monitor circuitry detects that a significant proportion of the previous hits occur in cache 4, but cache 4 is not snooped until snoop phase 3, then it may decide to identify cache 4 in an earlier snoop phase within the relevant snoop scheme stored in the snoop control storage 60. In one embodiment, this may also involve demoting one of the other caches to a later snoop phase.

In addition to, or as an alternative to, dynamically modifying the cache allocation to particular snoop phases, it is also possible dependent on the metrics maintained by the monitor circuitry 55 to dynamically reprogram the snoop scheme itself. Hence, by way of example, an original snoop scheme may be reprogrammed with a different snoop scheme having less snoop phases, or with a snoop scheme where at a particular snoop phase a snoop operation is performed to multiple caches where previously a snoop operation to a single cache would have taken place (or vice versa).

It is also possible in certain embodiments of the present invention to define one or more snoop schemes that omit one or more of the caches from all of the snoop phases. When such a snoop scheme is selected by the snoop control storage based on the access request information, the snoop process is then restricted to a subset of the total possible caches that could be snooped, such an approach often being referred to as "sparse" snooping. Such an approach may be appropriate where for particular types of access request it can be determined that one or more of the caches will not store the data that is the subject of the access request.

If as a result of the snoop process the data that is the subject of the access request is not located in any of the caches, it will then be necessary to perform a lookup in the shared memory 70 in order to access the data. Whilst in one embodiment the snoop unit 50 may wait until the snoop process has been completed before issuing an access request to shared memory, there is often significant latency involved in accessing shared memory, and hence in one embodiment snoop unit 50 can be arranged to initiate the access to shared memory before the entire snoop process is complete. By way of example, if when employing a particular snoop scheme, there is an expectation that if the required data has not been found during the first two snoop phases, it is unlikely to be found during the remaining snoop phases, then the access to shared memory can be initiated after those first two snoop phases have taken place (or earlier if performance is more important than power saving). Further, in one embodiment, the exact time at which the access to shared memory is initiated can be varied dependent on the snoop scheme being used. Hence, this provides a great deal of flexibility as to when accesses to shared memory are performed for any particular access request.

As will be discussed later in more detail with reference to FIG. 5, whilst in one embodiment the snoop unit 50 will always be arranged to employ one of the snoop schemes identified in the snoop control storage 60, it is also possible in alternative embodiments to selectively override the snoop scheme identified by the snoop control storage, and instead to employ a full parallel snoop to all relevant caches. This may for example be appropriate if the data processing apparatus is being run in a particular mode of operation where performance is the key requirement, whilst in other modes of operation the snoop unit 50 will perform snoop processes using the snoop schemes identified by the snoop control storage 60.

Figure 2:
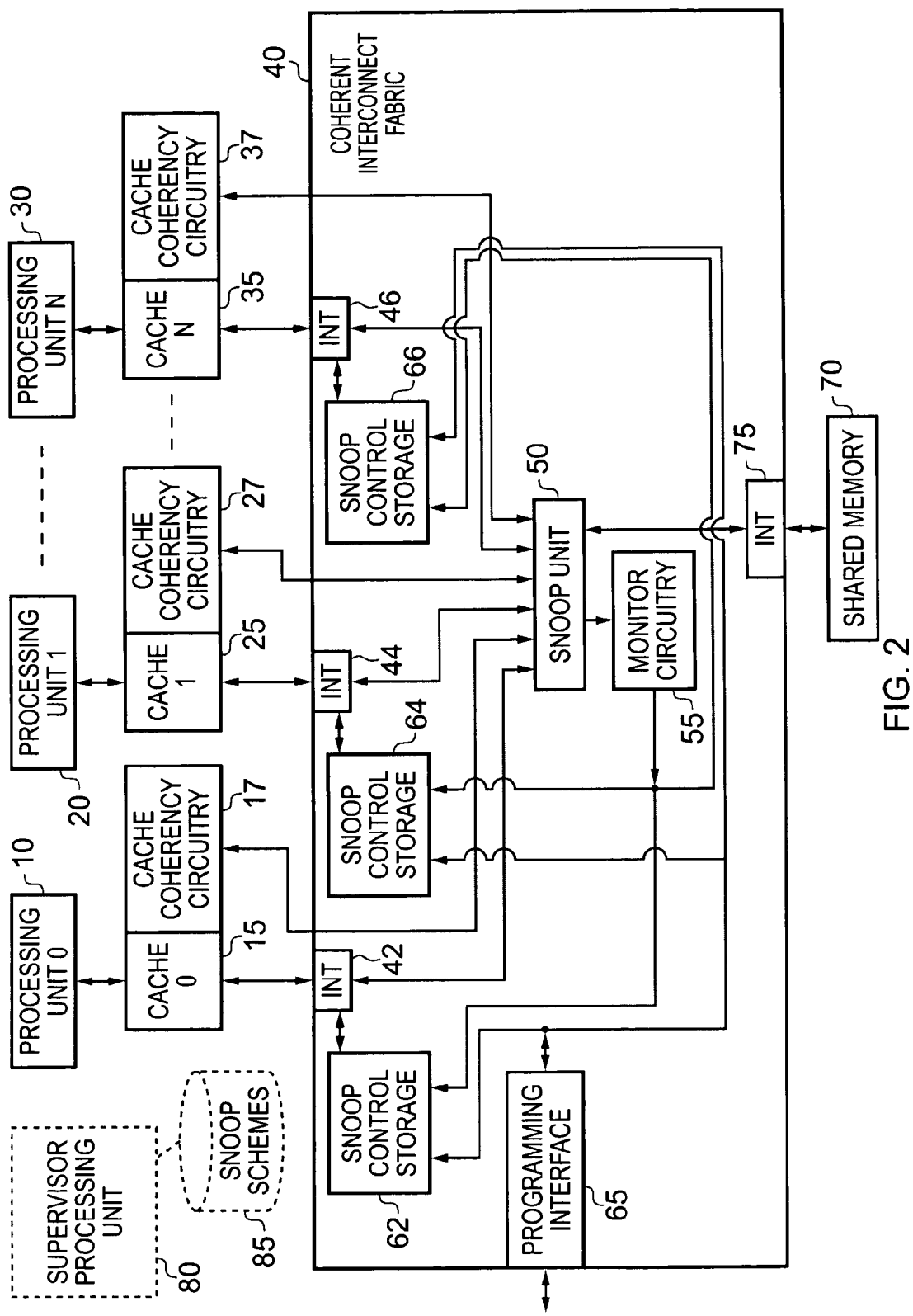
FIG. 2 is a block diagram of a data processing apparatus in accordance with an alternative embodiment of the present invention.

Whilst in FIG. 1 the snoop control storage 60 is shown as a centralised resource, it is also possible in alternative embodiments to decentralise that resource, and for example to provide separate snoop control storages 62, 64, 66 in association with each of the interfaces 42, 44, 46, as shown in FIG. 2. By such an arrangement, the snoop control storage 62 can be arranged to store one or more snoop schemes appropriate for access requests issued by the processing unit 10, the snoop control storage 64 can be arranged to store one or more snoop schemes appropriate for access requests issued by processing unit 20, and the snoop control storage 66 may be arranged to store one or more snoop schemes appropriate for access requests issued by the processing unit 30. In this embodiment, the snoop unit 50 can be arranged to reference the snoop control storages directly, or alternatively (as shown in FIG. 2) can reference the snoop control storages indirectly via the associated interfaces.

Hence, by way of example, if the cache coherency circuitry 17 indicates to the snoop unit 50 that a snoop process is required in respect of an access request issued by the processing unit 10, the snoop unit 50 can obtain an indication of the snoop scheme to be used from the snoop control storage 62 via the interface 42. The interface 42 may perform the lookup in the snoop control storage 62 directly based on information received from the cache 15, or alternatively may access the snoop control storage 62 on the request of the snoop unit 50. Either way, the snoop unit 50 is provided via the interface 42 with the details of the required snoop scheme, and for each snoop phase will issue the required control signals to the relevant cache coherency circuits 17, 27, 37, to cause the caches associated with that snoop phase to be snooped. The response of that snoop operation will then be returned to the snoop unit 50 from the relevant cache coherency circuits 17, 27, 37.

Other than the use of the separate snoop control storages 62, 64, 66 in the embodiment of FIG. 2, this embodiment operates in the same way as that described earlier with reference to FIG. 1. Hence, the snoop schemes can be reprogrammed via the programming interface 65, and/or dynamically altered/reprogrammed via the monitor circuitry 55.

Figure 3:
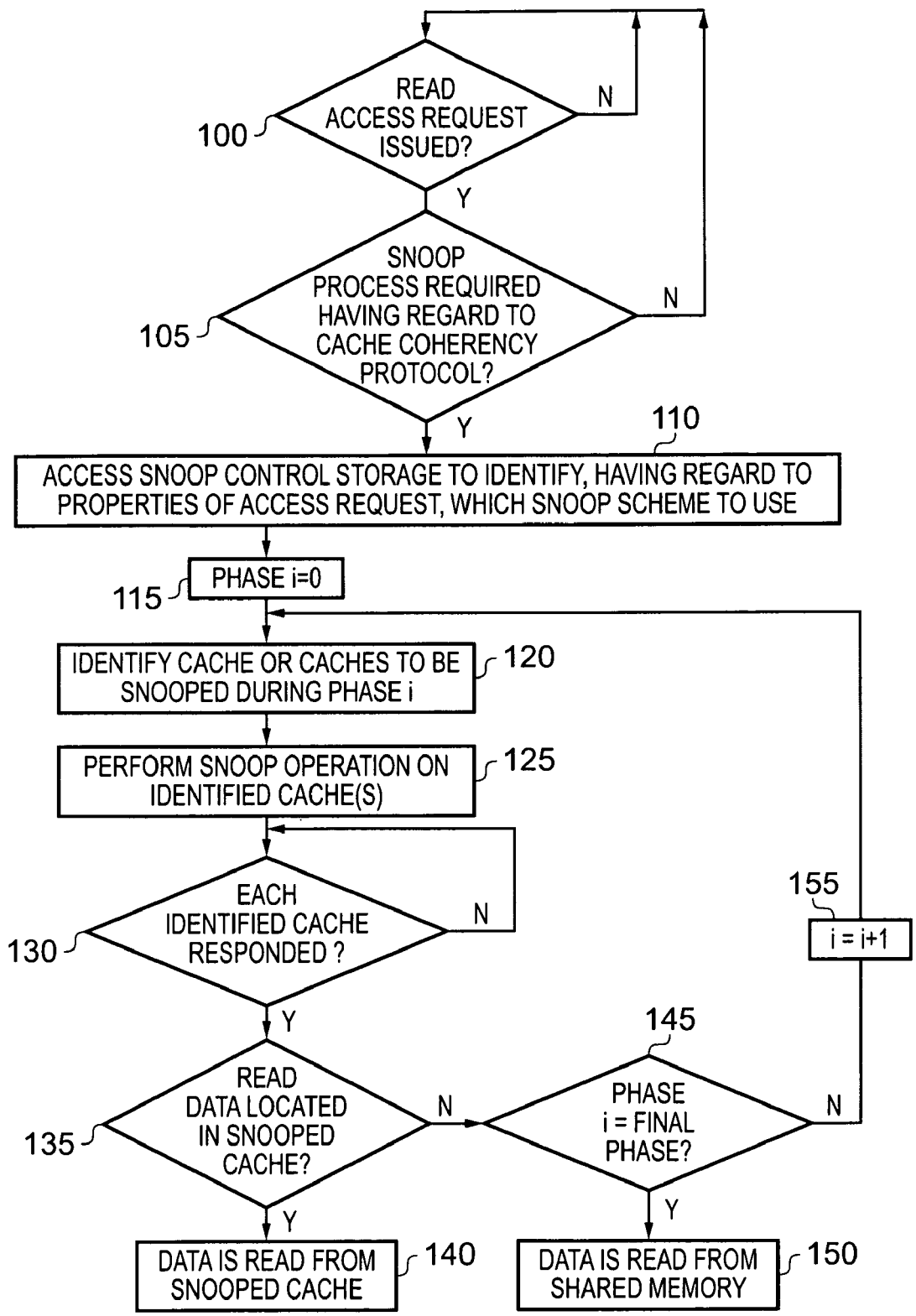
FIG. 3 is a flow diagram illustrating how snoop processes are performed for read access requests in accordance with one embodiment of the present invention.

FIG. 3 is a flow diagram illustrating how the snoop process is managed for read access requests in accordance with one embodiment of the present invention. At step 100 it is determined whether a read access request has been issued, and on detection of a read access request the process proceeds to step 105 where the relevant cache coherency circuitry determines whether a snoop process is required having regards to the cache coherency protocol. Hence, by way of example, considering FIG. 1 or 2, for a read access request issued by the processing unit 10, the cache coherency circuitry 17 will determine at step 105 whether a snoop process is required. In particular, if the data is not stored in the cache 15, the cache coherency circuitry 17 may decide that a snoop process is required. However, a snoop process will be determined not to be required if the read access request identifies that the data is non-shareable, and hence would not be accessed by any of the other processing units and so could not be stored in their local caches.

Assuming a snoop process is required, then at step 110 the snoop control storage 60 (or the relevant snoop control storage 62, 64, 66 for the FIG. 2 example) is accessed in order to identify, having regards to properties of the access request, which snoop scheme to use.

Thereafter, at step 115, the variable i is set equal to zero to identify phase zero of the snoop scheme. Thereafter, at step 120, the cache or caches to be snooped during phase i are identified by the snoop unit with reference to the information obtained from the snoop control storage, whereafter at step 125 a snoop operation is performed on each identified cache. This is achieved via the snoop unit 50 issuing appropriate control signals to the relevant cache coherency circuits 17, 27, 37.

Thereafter, at step 130 the snoop unit waits until each identified cache has responded to the snoop operation, as indicated by the responses received by the snoop unit 50 from each of the cache coherency circuits. Thereafter, it determines whether the read data required has been located in one of the snooped caches (see step 135), and if so the data is then read from that snooped cache at step 140. The data may also, in some embodiments, be locally cached at that time.

If the read data has not been located in a snooped cache, then the process proceeds to step 145, where it is determined whether phase i is the final phase. If not, then i is incremented at step 155, and the process is repeated starting at step 120. If at step 145 it is determined that the final phase has been reached, then the process proceeds to step 150, where the data is read from the shared memory 70. As with step 140, the data may also be locally cached at that time.

Hence, it will be seen that in such embodiments, it is often not necessary for every snoop phase of an identified snoop scheme to be completed. In particular, if the access request is a read access request, and the data which is the subject of the access request is located in a cache during a particular snoop phase of the snoop scheme, any remaining phases of the snoop scheme are not performed (given the branch of the process from step 135 to step 140). Since the cache coherency protocol will make sure that all copies of the data are up-to-date, once one copy of the data has been found, there is no need to continue to snoop any of the remaining caches, and accordingly snoop energy can be further reduced by terminating the snoop scheme at that point.

Figure 4:
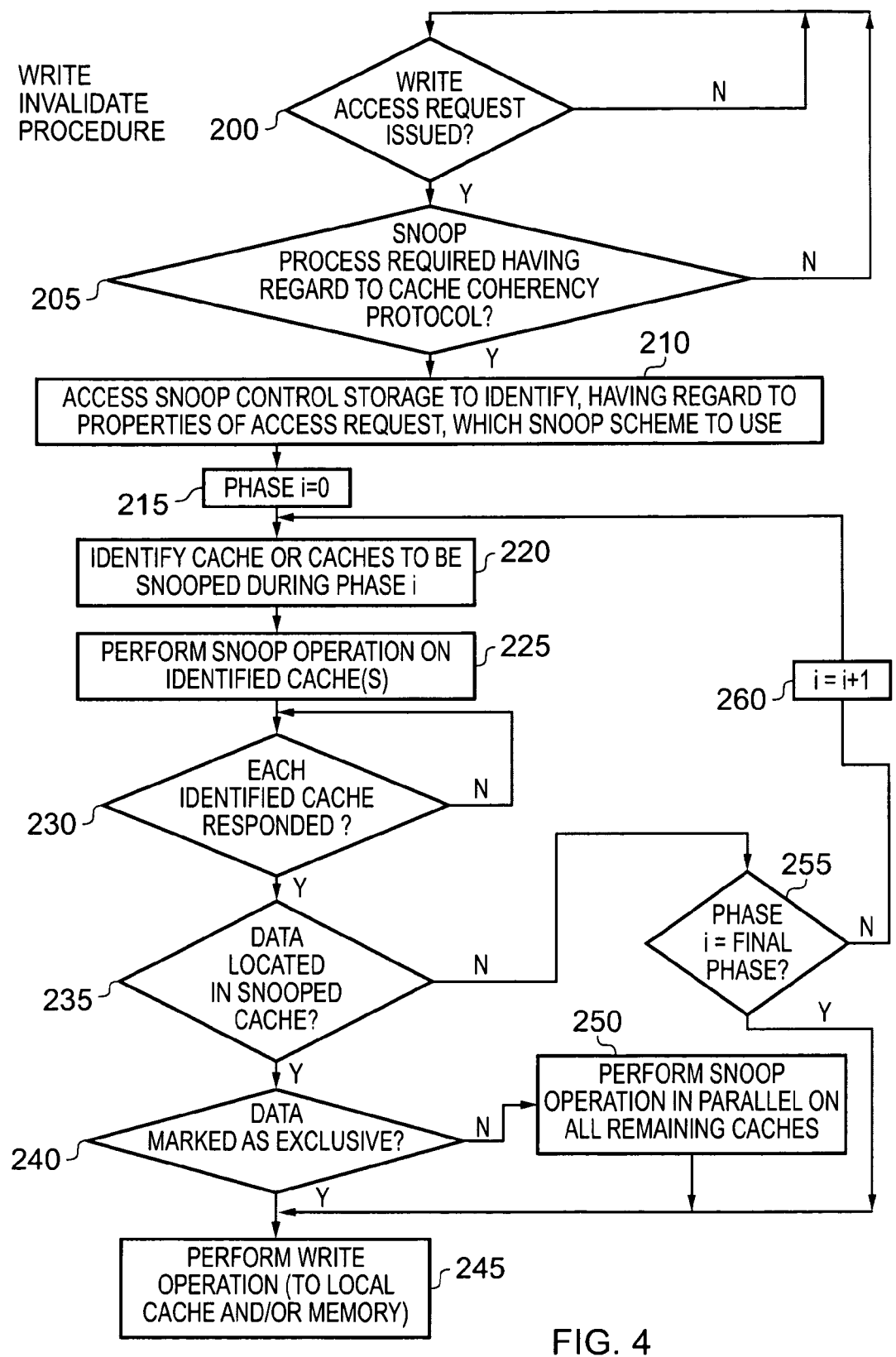
FIG. 4 is a flow diagram illustrating how snoop processes are performed for write access requests in accordance with one embodiment of the present invention.

However, the techniques of embodiments of the present invention, and the ability to terminate snoop schemes early, is not restricted only to read access requests. For example, FIG. 4 shows a flow diagram illustrating how snoop processes required for write access requests can be handled when a write invalidate procedure is used. At step 200, it is determined whether a write access request has been issued, and once a write access request has been detected, the relevant cache coherency circuit then determines at step 205 whether a snoop process is required having regard to the cache coherency protocol. Hence, by way of example, if the processing unit 10 issues a write access request, and the data is not found in the local cache 15, the cache coherency circuitry 17 will typically decide that a snoop process is required. Similarly, even if the write data is found in the cache 15, but the cache coherency circuitry has marked that data as being non-exclusively held by that cache, then that cache coherency circuitry will typically identify that a snoop process is required.

Upon detecting that a snoop process is required, the process proceeds to step 210, where the relevant snoop control storage is accessed to identify, having regard to properties of the access request, which snoop scheme is to be used.

Steps 215, 220, 225 and 230 are then analogous to the steps 115, 120, 125 and 130 of FIG. 3. Once each of the caches snooped in phase zero have responded, then it is determined at step 235 whether any of the snooped caches holds a copy of the data that is to be overwritten by the write access request. If not, then the process proceeds to step 255, where it is determined whether the final phase has been performed, and if not the variable i is incremented at step 260 and the process returns to step 220.

However, if one of the snoop caches is determined at step 235 to contain a copy of the data that is now to be overwritten, it is then determined at step 240 whether the data stored in that snooped cache was marked as being exclusively owned by that snooped cache. This information will typically be returned by the relevant cache coherency circuit as part of the response data for the snoop operation. If the data is marked as exclusive, then the snoop unit can now determine that any remaining phases of the snoop scheme are not required, and accordingly the process proceeds directly to step 245 where a write operation is now performed. This may involve performing a write to the local cache, and/or a write to the shared memory 70. Since the snooped cache that held the data will have invalidated its entry in response to the snoop operation (given that a write invalidate procedure is being used), and that snooped cache held the data exclusively, it is therefore known that no other copies of that data exists in any of the caches, and accordingly no other actions are required.

However, if at step 240 it is determined that the data found in the snooped cache was not marked as exclusive, then this means that all of the other remaining caches will need to be snooped. Whilst the remaining phases of the snoop scheme could be used to perform this process, in one embodiment as shown by step 250, the remaining phases of the snoop scheme are replaced by a snoop operation performed in parallel on all of the remaining caches, thereby seeking to maximise performance for the remainder of the snoop process. It should be noted that this parallel snoop operation can be different to the earlier snoop operation(s), since no data transfer is required given that the data has already been located at step 235. Instead the parallel snoop operation at this point is a snoop for uniqueness, not a snoop for data and uniqueness. Once the snoop operation has been performed in parallel at step 250 on all of the remaining caches, then the process can proceed to step 245 to allow the write operation to proceed. Step 245 can also be reached from step 255, in situations where the final phase of the snoop scheme has been performed, and no copies of the data have been found in any snooped caches.

Whilst the scheme of FIG. 4 can be used when employing a write invalidate procedure, in one embodiment if a write update procedure is used instead of a write invalidate procedure, then the snoop unit is arranged for write access requests not to access the snoop control storage, but instead to perform a parallel snoop operation in all relevant caches.

Figure 5:
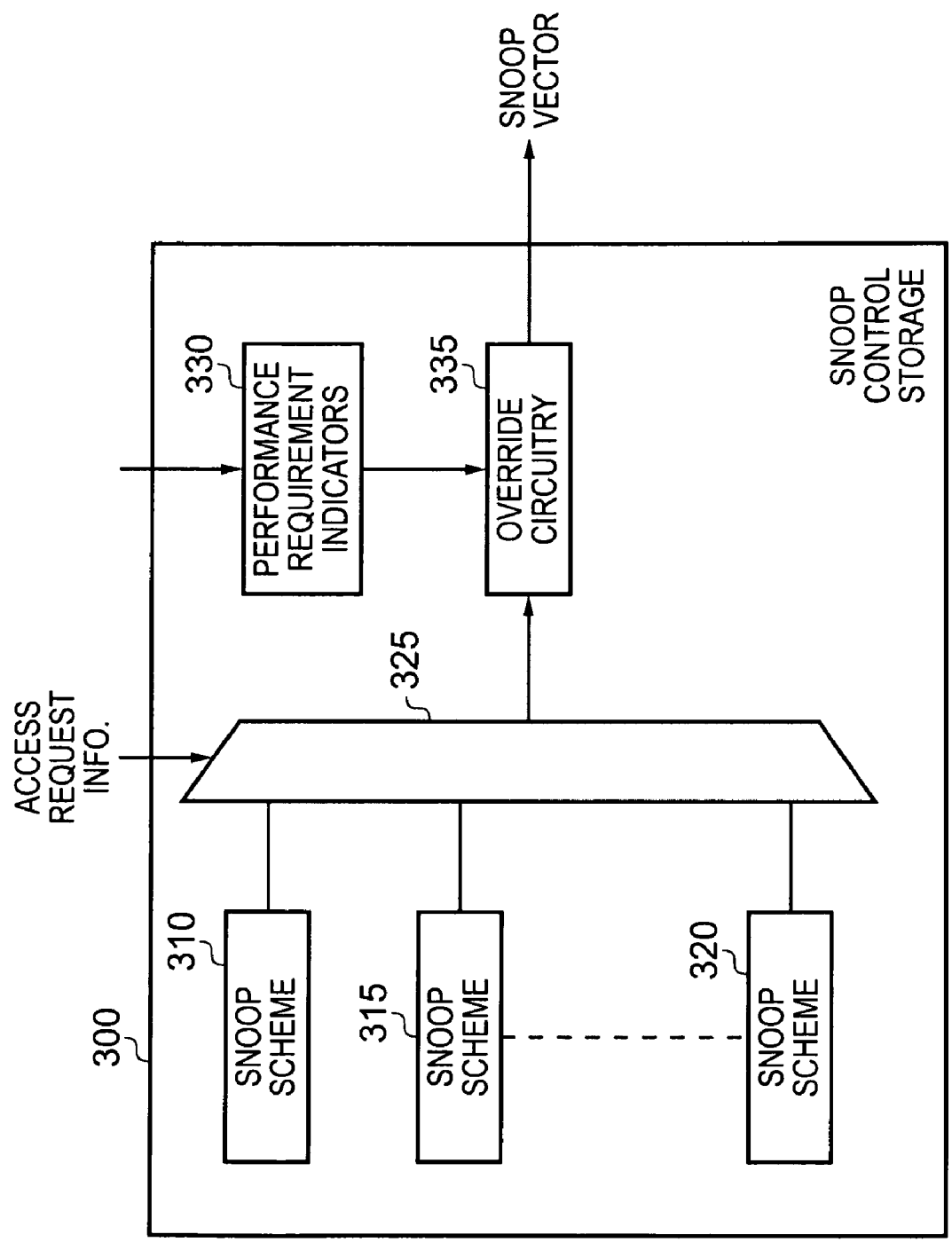
FIG. 5 schematically illustrates the arrangement of snoop control storage in accordance with one embodiment of the present invention.

FIG. 5 is a block diagram illustrating the logical elements that may be provided within each snoop control storage, whether that be the centralised snoop control storage 60 of FIG. 1, or one of the distributed snoop control storages 62, 64, 66 of FIG. 2. As shown in FIG. 5, the snoop control storage 300 may comprise a plurality of sets of registers 310, 315, 320, with each set of registers being arranged to store a snoop scheme. As discussed earlier the snoop schemes are programmed into the registers via the programming interface 65.

Multiplexer circuitry 325 is then arranged in response to the access request information derived from the access request to determine which of the snoop schemes should be selected to implement the snoop process for that access request. As discussed previously, the properties of the access request that are used to control the multiplexer can take a variety of forms, and may for example include one or more of an indication of the processing unit issuing the access request, a type of the access request, an address specified in the access request and/or a transaction property associated with the access request.

The selected snoop scheme is then output from the snoop control storage 300 as one or more snoop vectors, each snoop vector identifying the caches to be subjected to a snoop operation in an associated snoop phase.

As shown in FIG. 5, override circuitry 335 may be provided to receive the output from the multiplexer 325 and to selectively override that output. In particular, in one embodiment the snoop control storage may receive from the data processing apparatus various performance requirement indicators which can then be stored in the storage 330. These performance requirement indicators may be global, for example identifying that the apparatus is in a particular mode of operation where high performance is the key requirement, and accordingly the override circuitry 335 should override the output from the multiplexer 325, and instead indicate to the snoop unit that a full parallel snoop should be performed in parallel across all relevant caches. Alternatively, different performance requirement indicators can be provided for different access request types so that the operation of the override circuitry 335 is dependent on the properties of the access request in question. Hence, the performance requirement indicators 330 might indicate that for processing unit 10, the override circuitry 335 should override the output from the multiplexer 325, whilst for the other processing units the override circuitry should not override the output.

Accordingly, it can be seen that by providing such override circuitry 335, it is possible to identify situations in which the use of the snoop schemes should be overridden, and instead a full parallel snoop of all caches should take place. However, it will be appreciated that there is no requirement to provide such override circuitry and in alternative embodiments elements 330 and 335 may be omitted, with the snoop unit 50 then always implementing the snoop processes using the snoop schemes identified by the snoop control storage. Further, considering the distributed snoop control storage approach shown in FIG. 2, it will be appreciated that one or more of those snoop control storages could include override circuitry, whilst others might not include such override circuitry.

Figure 6:
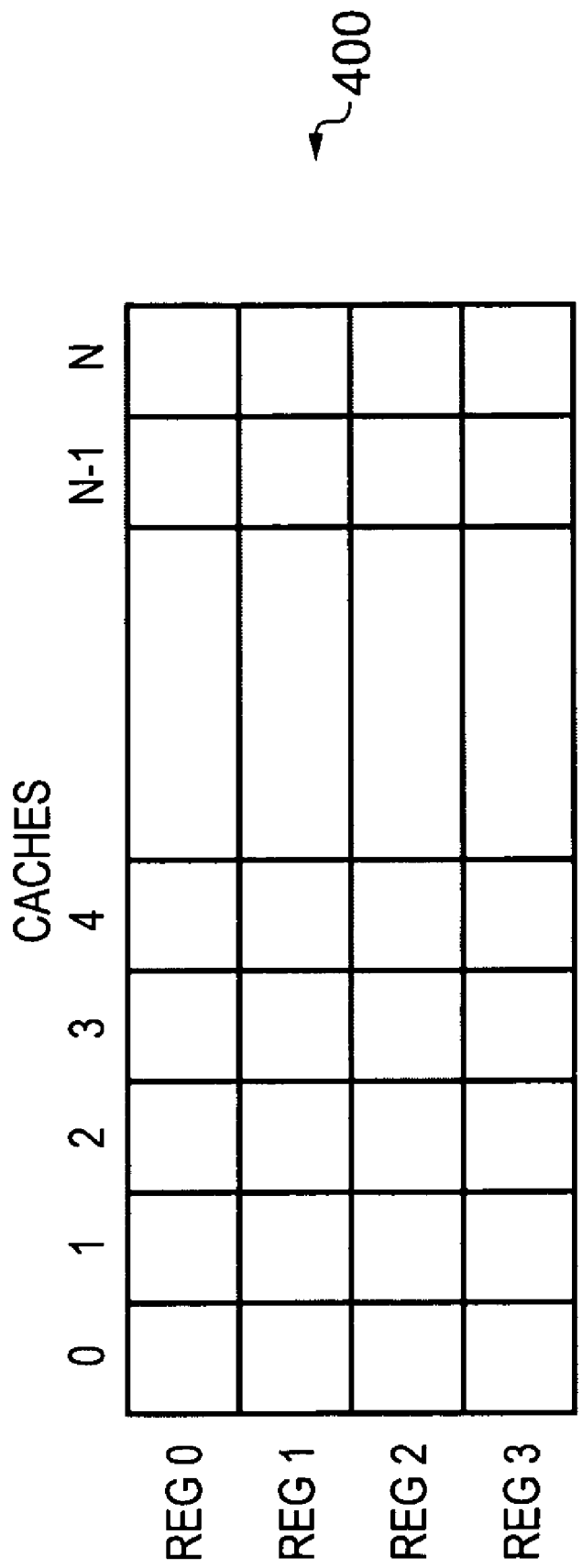
FIG. 6 schematically illustrates how a plurality of registers can be provided within the snoop control storage to store each snoop scheme, in accordance with one embodiment of the present invention.

FIG. 6 schematically illustrates a set of registers that may be provided within the snoop control storage 300 to store each snoop scheme. Accordingly, as shown in FIG. 6 a set of registers 400 may be provided with one bit of each register being associated with each of the caches 0 to N. In the example illustrated in FIG. 6, it is assumed that there is a maximum of four snoop phases per snoop scheme, and that one register is used for each snoop phase, in order to identify the caches which should be subjected to the snoop operation in that snoop phase. Each cache will only be subjected to a snoop operation in one of the snoop phases, and hence in each of the vertical columns shown in FIG. 6, only one of the entries will be set. Further, if sparse snooping is used for any particular snoop scheme, then it is possible that one or more of the caches will never snooped, and hence all of the relevant entries for that cache will be clear.

Figure 7:
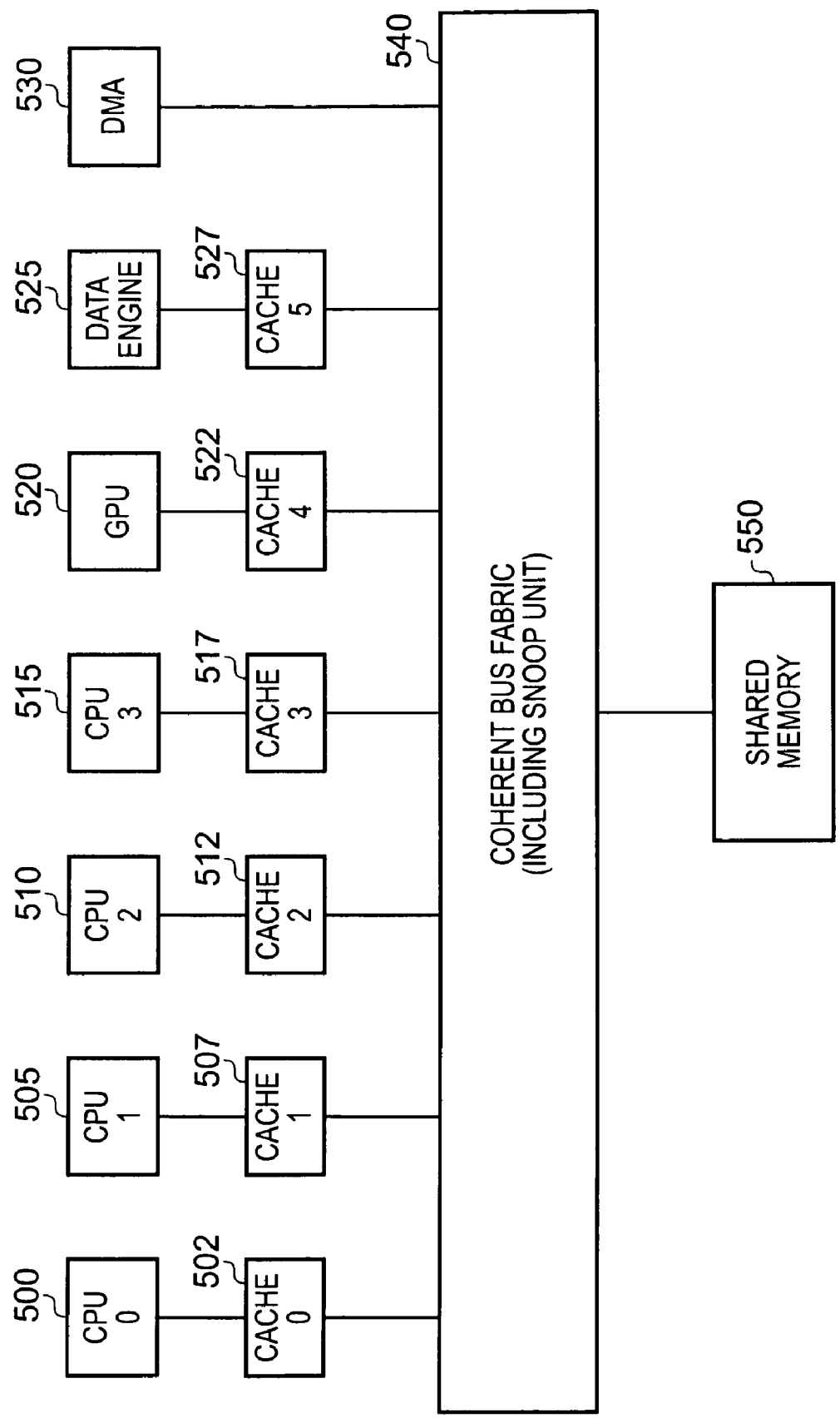
FIG. 7 schematically illustrates a multiprocessor system in which embodiments of the present invention may be incorporated.

FIG. 7 illustrates an example implementation of a data processing apparatus incorporating the techniques of embodiments of the present invention. In the example illustrated, the coherent bus fabric 540 has seven devices connected thereto, namely four central processing units (CPUs) 500, 505, 510, 515, a graphics processing unit (GPU) 520, a data engine 525, and a direct memory access (DMA) controller 530. Further, shared memory 550 is also connected to the coherent bus fabric 540. The devices 500, 505, 510, 515, 520, 525 each have an associated local cache 502, 507, 512, 517, 522 and 527, respectively. In contrast, the DMA controller has no local cache and is connected directly to the coherent bus fabric 540. Whilst the DMA controller 530 may have no local cache, and hence does not need to respond to snoop requests, it is still possible that certain transactions issued by the DMA controller will require the initiation of a snoop process to be performed in respect of the caches of other data processing units.

To illustrate how various snoop schemes can be provided for such a system, the following example use case is provided purely for purposes of illustration. In this example, the CPUs 500, 505, 510 may be arranged as an SMP (symmetric multiprocessor) cluster whereas the CPU 515 may be arranged as a separate, low power, processor. In such a system, each CPU in the SMP cluster might be equally likely to be sharing required data, whereas CPU 515, GPU 520 and data engine 525 might share such data on an infrequent basis. Accordingly, an access request issued by CPU 500, and requiring a snoop process, might have the snoop process actioned by a snoop scheme that identifies that caches 507 and 512 should be snooped in parallel in a first snoop phase, with caches 517, 522, 527 then being snooped in parallel in a second snoop phase.

As another example, the CPU 515 might be performing a task on behalf of one of the CPUs 500, 505, 510 in the cluster. Accordingly, when a snoop process is required in respect of an access request issued by the CPU 515, the identified snoop scheme may specify as a first snoop phase a snoop operation to be performed in the one cache amongst caches 502, 507, 512 where the most recent hit occurred (from the preceding snoop process), followed by a second snoop phase in which the remaining two caches of the clustered CPUs are snooped, followed in a third snoop phase by a parallel snoop to caches 522 and 527.

The snoop scheme defined for access requests issued by the GPU 520 may be varied depending on the GPU's real time requirements as it processes a frame of data. It might for example use a sequence of serial snoops at the beginning of a frame, but change the snoop scheme towards a more parallel scheme as it moves towards a hard deadline.

As another example, the data engine 525 might be latency tolerant, such that the snoop scheme defined for access requests from the data engine identify a large number of snoop phases, with each snoop phase involving a snoop operation on a single cache. In such a scheme, the cache 522 associated with the GPU 520 might be identified in the first snoop phase, on the basis that the data engine shares most of its data with the GPU.

It will be appreciated that the above example is purely for the purpose of illustration, and should not be viewed as in any way limiting as to how the snoop schemes are defined for any particular access request. It will be appreciated that the various snoop schemes programmed into the snoop control storage may be determined taking into account a number of different factors. Such factors may include one or more of: the cache or caches in which the data is most likely to be found, the access cost associated with each cache (there may be inherently more cost in accessing some caches than others due to their size, location, etc), and/or the requirements of the processing unit issuing an access request whose snoop process is to be serviced by the snoop scheme (for example whether that processing unit is latency tolerant, or requires maximum performance).

In accordance with embodiments of the present invention, a plurality of snoop schemes can be defined within snoop control storage, with each snoop scheme specifying a hybrid of serial and parallel snooping which can be used to optimise the handling of snoop processes for particular properties of access requests. In each snoop phase of a defined snoop scheme, anything between a single cache (entirely serial snoop) and all caches (entirely parallel snoop) can be snooped.

Accordingly, for each of a number of different types of access, snoop schemes can be defined. Hence, as an example, each originating cache contacting the coherent interconnect fabric 40 can have its own hybrid serial/parallel snoop scheme defined to match its requirements, whether that be purely parallel for high performance, purely serial for low power consumption, or a reasonable compromise between the two (multiple snoop phases with some snoop phases involving serial snoop and some snoop phases involving parallel snoop). Furthermore, since the snoop control storage is programmable, this gives a user the opportunity to optimise snoop behaviour for each application use case.

Hence, the techniques of embodiments of the present invention provide a great deal of flexibility, offering power/performance trade-offs for snoop based coherency schemes. The snoop schemes can be defined globally, can be defined individually for each cache or can be specified for each cache line or block of data. Further, as discussed earlier, different snoop schemes can be defined for different types of access request, for example read access requests, write access requests, etc, or based on different transaction properties associated with access requests, for example priority, QoS, etc.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
a plurality of processing units for performing data processing operations requiring access to data in shared memory;
at least two of said processing units having a cache associated therewith for storing a subset of said data for access by that processing unit;
cache coherency circuitry for employing a snoop-based cache coherency protocol to ensure data accessed by each processing unit is up-to-date, on issuance of an access request by one of said processing units, the cache coherency circuitry determining whether a snoop process is required having regard to the snoop-based cache coherency protocol;
snoop control storage for defining a plurality of snoop schemes, each snoop scheme defining a series of snoop phases to be performed to implement the snoop process, and each snoop phase requiring a snoop operation to be performed on either a single cache or multiple caches; and
a snoop unit, responsive to the cache coherency circuitry determining that said snoop process is required, to reference the snoop control storage to identify, having regard to one or more properties of the access request, the snoop scheme to be employed to perform said snoop process.

2. A data processing apparatus as claimed in claim 1, wherein the snoop control storage is programmable to allow modification of the plurality of snoop schemes.

3. A data processing apparatus as claimed in claim 1, wherein the snoop operation of a current snoop phase is completed before a next snoop phase is performed.

4. A data processing apparatus as claimed in claim 1, wherein the plurality of snoop schemes comprise at least one snoop scheme with a different number of snoop phases to at least one other snoop scheme.

5. A data processing apparatus as claimed in claim 1, wherein the plurality of snoop schemes comprise at least two snoop schemes which have the same number of snoop phases, but which for at least one snoop phase differ with respect to whether a single cache or multiple caches are subjected to the snoop operation in that snoop phase.

6. A data processing apparatus as claimed in claim 1, wherein the snoop control storage provides at least one snoop scheme for each processing unit in said plurality, and the one or more properties of the access request used to determine which snoop scheme is to be employed to perform said snoop process comprise at least an identification of the processing unit issuing said access request.

7. A data processing apparatus as claimed in claim 6, wherein the snoop control storage provides a snoop control storage block for each processing unit, each snoop control storage block defining at least one snoop scheme that may be used to implement the snoop process for access requests issued by the associated processing unit.

8. A data processing apparatus as claimed in claim 1, wherein the snoop control storage defines snoop schemes for different types of access request, and the one or more properties of the access request used to determine which snoop scheme is to be employed to perform said snoop process comprise at least an identification of the type of said access request.

9. A data processing apparatus as claimed in claim 1, wherein the snoop control storage defines snoop schemes for different memory address ranges, and the one or more properties of the access request used to determine which snoop scheme is to be employed to perform said snoop process comprise at least an identification of the memory address specified by said access request.

10. A data processing apparatus as claimed in claim 1, wherein the snoop control storage defines snoop schemes for different transaction properties associated with access requests, and the one or more properties of the access request used to determine which snoop scheme is to be employed to perform said snoop process comprise at least an identification of the transaction property associated with said access request.

11. A data processing apparatus as claimed in claim 1, wherein each snoop scheme is constrained to a maximum number of snoop phases, the snoop control storage providing a set of registers for storing each snoop scheme, the number of registers in each set being dependent on the maximum number of snoop phases.

12. A data processing apparatus as claimed in claim 11, wherein if the snoop scheme defined in one set of registers has less than said maximum number of snoop phases, one or more registers in that set of registers are marked as unused.

13. A data processing apparatus as claimed in claim 1, wherein if the access request is a read access request, and the data which is the subject of the access request is located in a cache during a particular snoop phase of the snoop scheme, any remaining phases of the snoop scheme are not performed.

14. A data processing apparatus as claimed in claim 1, wherein if the access request is a write access request, and the data which is the subject of the access request is located in a cache during a particular snoop phase of the snoop scheme, and is identified as being exclusively held in that cache, any remaining phases of the snoop scheme are not performed.

15. A data processing apparatus as claimed in claim 1, wherein if the access request is a write access request, the cache coherency protocol applies a write invalidate protocol, and the data which is the subject of the access request is located in a cache during a particular snoop phase of the snoop scheme but is not identified as being exclusively held in that cache, any remaining phases of the snoop scheme are not performed, and instead the snoop operation is performed in parallel on all remaining relevant caches not yet subjected to the snoop operation.

16. A data processing apparatus as claimed in claim 1, wherein the snoop control storage includes override circuitry for receiving one or more performance requirement indicators, when the cache control circuitry references the snoop control storage, the override circuitry being arranged, dependent on said performance requirement indicators, to either identify, having regard to one or more properties of the access request, the snoop scheme to be employed to perform said snoop process, or instead to indicate to the snoop unit that the snoop operation should be performed in parallel in all relevant caches.

17. A data processing apparatus as claimed in claim 1, wherein the cache control circuitry further comprises monitor circuitry for maintaining, for a snoop scheme defined in the snoop control storage, one or more metrics derived from results of previous use of that snoop scheme, and to dynamically modify which caches are associated with each snoop phase of that snoop scheme dependent on said one or more metrics.

18. A data processing apparatus as claimed in claim 17, wherein at least one of said one or more metrics is a history of previous caches where hits have been detected during the snoop process.

19. A data processing apparatus as claimed in claim 1, wherein the cache control circuitry further comprises monitor circuitry for maintaining, for a snoop scheme defined in the snoop control storage, one or more metrics derived from results of previous use of that snoop scheme, and to dynamically reprogram that snoop scheme dependent on said one or more metrics.

20. A data processing apparatus as claimed in claim 2, wherein the snoop control storage is programmed once at boot time.

21. A data processing apparatus as claimed in claim 2, wherein the snoop control storage is programmed periodically during run time.

22. A data processing apparatus as claimed in claim 21, wherein the snoop control storage is reprogrammed on occurrence of one or more events during operation of the data processing apparatus.

23. A data processing apparatus as claimed in claim 22, wherein said one or more events comprise at least one of a change in a global mode of operation or a change of task by one of said processing units.

24. A data processing apparatus as claimed in claim 23, further comprising a supervisor processor for monitoring the global mode of operation of the data processing apparatus and for reprogramming one of more of the snoop schemes in the snoop control storage upon a change in said global mode of operation.

25. A data processing apparatus as claimed in claim 24, wherein the supervisor processor has access to a lookup table identifying the snoop schemes to be used for each global mode of operation.

26. A data processing apparatus as claimed in claim 1, wherein at least one of said snoop schemes defined in said snoop control storage omits one or more caches from all of the snoop phases.

27. A data processing apparatus as claimed in claim 1, wherein the snoop unit is arranged to initiate a lookup in the shared memory at a point during performance of the snoop process that is dependent on the identified snoop scheme.

28. A method of managing snoop operations in a data processing apparatus, the data processing apparatus comprising a plurality of processing units for performing data processing operations requiring access to data in shared memory, at least two of said processing units having a cache associated therewith for storing a subset of said data for access by that processing unit, the method comprising the steps of:
   employing a snoop-based cache coherency protocol to ensure data accessed by each processing unit is up-to-date;
   on issuance of an access request by one of said processing units, determining whether a snoop process is required having regard to the snoop-based cache coherency protocol;
   defining within snoop control storage a plurality of snoop schemes, each snoop scheme defining a series of snoop phases to be performed to implement the snoop process, and each snoop phase requiring a snoop operation to be performed on either a single cache or multiple caches; and
   when said snoop process is required, referencing the snoop control storage to identify, having regard to one or more properties of the access request, the snoop scheme to be employed to perform said snoop process.

29. A coherent interconnect fabric for use in a data processing apparatus having a plurality of processing units for performing data processing operations requiring access to data in shared memory, at least two of said processing units having a cache associated therewith for storing a subset of said data for access by that processing unit, the data processing apparatus employing a snoop-based cache coherency protocol to ensure data accessed by each processing unit is up-to-date, on issuance of an access request by one of said processing units, the snoop-based cache coherency protocol being referenced to determine whether a snoop process is required, the coherent interconnect fabric comprising:
   snoop control storage for defining a plurality of snoop schemes, each snoop scheme defining a series of snoop phases to be performed to implement the snoop process, and each snoop phase requiring a snoop operation to be performed on either a single cache or multiple caches; and
   a snoop unit, responsive to a determination that said snoop process is required, to reference the snoop control storage to identify, having regard to one or more properties of the access request, the snoop scheme to be employed to perform said snoop process.

30. A data processing apparatus comprising:

a plurality of processing means for performing data processing operations requiring access to data in shared memory means;

at least two of said processing means having a cache means associated therewith for storing a subset of said data for access by that processing means;

cache coherency means for employing a snoop-based cache coherency protocol to ensure data accessed by each processing means is up-to-date, on issuance of an access request by one of said processing means, the cache coherency means for determining whether a snoop process is required having regard to the snoop-based cache coherency protocol;

snoop control storage means for defining a plurality of snoop schemes, each snoop scheme defining a series of snoop phases to be performed to implement the snoop process, and each snoop phase requiring a snoop operation to be performed on either a single cache or multiple caches; and a snoop means, responsive to the cache coherency means determining that said snoop process is required, for referencing the snoop control storage means to identify, having regard to one or more properties of the access request, the snoop scheme to be employed to perform said snoop process.

* * * * *